(12) United States Patent
Gretz (10) Patent No.: US 6,777,615 B1
(45) Date of Patent: Aug. 17, 2004

(54) FAN RATED JUNCTION BOX ASSEMBLY

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 10/723,122

(22) Filed: Nov. 26, 2003

Related U.S. Application Data (63) Continuation-in-part of application No. 10/464,334, filed on Jun. 18, 2003, now Pat. No. 6,734,356, which is a continuation-in-part of application No. 10/361,292, filed on Feb. 10, 2003, now Pat. No. 6,632,998, which is a continuation-in-part of application No. 10/287,088, filed on Nov. 4, 2002, now Pat. No. 6,646,201, which is a continuation-in-part of application No. 10/012,584, filed on Nov. 7, 2001, now Pat. No. 6,509,524, and a continuation-in-part of application No. 10/017,571, filed on Oct. 22, 2001, now Pat. No. 6,677,523, which is a continuation-in-part of application No. 09/373,431, filed on Aug. 13, 1999, now Pat. No. 6,191,362.

(51) Int. Cl.$^7$ ................................................. H01H 9/02
(52) U.S. Cl. ............................. 174/58; 174/48; 174/50; 174/63; 174/60; 220/3.3; 220/4.02
(58) Field of Search .............................. 174/48, 50, 58, 174/63, 17 R, 60, 135; 439/535; 248/906; 220/3.3, 4.02, 3.9; 52/39

(56) References Cited

U.S. PATENT DOCUMENTS

| | | | |
|---|---|---|---|
| 4,770,311 A | | 9/1988 | Wang |
| 4,892,211 A | | 1/1990 | Jorgensen |
| 4,919,292 A | | 4/1990 | Hsu |
| 5,693,909 A | * | 12/1997 | McEwen ................. 174/58 |
| 5,762,223 A | * | 6/1998 | Kerr, Jr. ................. 220/3.9 |
| 5,854,443 A | * | 12/1998 | Reiker ................... 174/58 |
| 6,191,362 B1 | * | 2/2001 | Gretz ..................... 174/58 |
| 6,509,524 B1 | * | 1/2003 | Gretz ..................... 174/50 |
| RE38,120 E | | 5/2003 | Bordwell et al. |
| 6,632,998 B1 | * | 10/2003 | Gretz ..................... 174/58 |
| 6,646,201 B1 | * | 11/2003 | Gretz ..................... 174/58 |

* cited by examiner

Primary Examiner—Dhiru R Patel (57) ABSTRACT

An electrical junction box assembly for easing the installation of a flush-mounted junction box and an electrical device to an overhead support structure. Installation of the junction box is simplified by the inclusion of fasteners temporarily held in storage locations integral with the assembly. The junction box assembly includes an electrical junction box having a top wall, a side wall, and apertures within the top wall. A portion of the side wall is bent at a right angle into the interior of the junction box thereby forming a ledge above the bottom rim. The ledge includes a bore therein defining a first screw holder. Opposing slots in the side walls include two right angle support members each having a first leg secured to the outer surface of the side wall and a second leg extending through the slots. The second leg includes at least one threaded bore therein defining a second screw holder. A first screw is threadedly engaged in the first screw holder and a second screw threadedly engaged in the second screw holder. The screw holders serve as temporary storage locations for the screws with the screws held within the confines of the junction box assembly.

20 Claims, 5 Drawing Sheets

FAN RATED JUNCTION BOX ASSEMBLY

This application is a Continuation-In-Part of U.S. patent application Ser. No. 10/464,334 entitled Prepackaged Mounting Assembly and Bracket Combination, filed Jun. 18, 2003 now U.S. Pat. No. 6,734,356, which is a Continuation-In-Part of Ser. No. 10/361,292 entitled "Prepackaged Mounting Assembly with Holstered Screws", filed Feb. 10, 2003 now U.S. Pat. 6,632,998, which is a Continuation-In-Part of U.S. patent application Ser. No. 10/287,088 entitled "Prepackaged Mounting Assembly", filed Nov. 4, 2002 now U.S. Pat. No. 6,646,201, which is a Continuation-In-Part of U.S. patent application Ser. No. 10/012,584 entitled "Prepackaged Mounting Assembly", filed Nov. 7, 2001, now U.S. Pat. 6,509,524, and is a Continuation-In-Part of U.S. patent application Ser. No. 10/017,571 now U.S. Pat. No. 6,677,523, entitled "Electrical Fixture Mounting Box and Mounting Assembly", filed Oct. 22, 2001, which is a Continuation-In-Part of U.S. patent application Ser. No. 09/373,431 entitled "Electrical Fixture Mounting Box", filed Aug. 13, 1999, now U.S. Pat. No. 6,191,362, which all of the above are incorporated by reference herein in their entireties.

FIELD OF THE INVENTION

This invention relates to electrical outlet boxes and specifically to a flush mounted junction box capable of supporting a heavy device from an overhead surface.

BACKGROUND OF THE INVENTION

Electrical junction boxes are used to provide safe enclosures for isolating wiring connections from the surrounding structure of a house. In the case in which these junction boxes are flush mounted on ceilings for the purpose of directly supporting ceiling fans, light fixtures, chandeliers, or other electrical devices, the junction box must be strong enough to support a relatively large load.

Various considerations are necessary in providing junction boxes for ceiling-mounted electrical devices. The National Electrical Code specifies a maximum weight of 80 pounds for ceiling light fixtures and a maximum weight of 70 pounds for ceiling fans. It is therefore important that an electrical box be structurally strong to carry the static load of the suspended electrical device, and in the case of a ceiling fan, the dynamic load presented by the rotation of the fan. It is also important that the fasteners used to anchor the junction box to the ceiling and to secure the electrical device to the junction box be capable of supporting the static and dynamic loads exerted by the suspended device.

Another consideration arises during the installation of the flush mounted electrical box and concerns the awkwardness of working overhead. Typically, when securing an electrical box to the overhead supporting structure, the installer is forced to manipulate several separate items. These include the electrical junction box, the fasteners for securing the junction box to the ceiling structure, and the fasteners for mounting the electrical device to the junction box. Considering that the installer is typically on a ladder, the task of securing a junction box to the ceiling and then an electrical device to the junction box can be quite a challenge. It is therefore imperative that all parts necessary for a successful installation, including the fasteners for securing the electrical box to the ceiling structure and the fasteners for mounting the electrical device, are on hand for the installer. Additionally, all of the fasteners must be properly selected load-bearing fasteners for carrying the anticipated static and dynamic loads of the suspended electrical device.

Many flush mounted junction boxes have been proposed for the support of ceiling fans and light fixtures including U.S. Pat. No. RE38,120 to Bordwell, et al., U.S. Pat. No. 4,919,292 to Hsu, U.S. Pat. 4,892,211 to Jorgensen, and U.S. Pat. No. 4,770,311 to Wang.

Although the above prior art devices have focused on efforts to improve the strength of a flush mounted junction box, they have not fully addressed the difficult installation task and the packaging of the junction box for shipment and storage. What is needed is a flush mounted electrical junction box capable of supporting the static and dynamic loads of the suspended device and which includes all of the proper fasteners for installation, with all fasteners stored in convenient storage locations integral with and located on the interior of the junction box and easily accessible by the installer when needed in the installation task.

These and other objects and advantages of the present invention will be better understood by reading the following description along with reference to the drawings.

SUMMARY OF THE INVENTION

The invention may be summarized as an electrical junction box assembly for easing the installation of a flush-mounted junction box and an electrical device to an overhead support structure. For simplifying the installation task, the junction box assembly includes all the required fasteners temporarily held in storage locations integral with the assembly. The junction box assembly includes an electrical junction box having top wall, a side wall, and apertures within the top wall. A portion of the side wall is bent at a right angle into the interior of the junction box thereby forming a ledge above the bottom rim. The ledge includes a bore therein defining a first screw holder. Opposing slots in the side walls include two right angle support members each having a first leg secured to the outer surface of the side wall and a second leg extending through the slots. The second leg includes at least one threaded bore therein defining a second screw holder. A first screw is threadedly engaged in the first screw holder and a second screw threadedly engaged in the second screw holder. The screw holders serve as temporary storage locations for the screws with the screws held within the confines of the junction box assembly.

TABLE OF NOMENCLATURE

The following is a listing of part numbers used in the drawings along with a brief description

| Part Number | Description |
| --- | --- |
| 20 | fan rated junction box assembly |
| 22 | top wall |
| 24 | bottom surface of top wall |
| 26 | side wall |
| 28 | bottom rim |
| 30 | open cavity |
| 32 | apertures in top wall |
| 34 | outer surface of side wall |
| 38 | ledge |
| 40 | bore in ledge |
| 42 | first screw holder |
| 44 | first screw |
| 46 | opposing slots |
| 48 | right angle support member |
| 50 | first leg |
| 52 | second leg |
| 54 | threaded bore in second leg |
| 54A | inner threaded bores in second leg |
| 54B | outer threaded bores in second leg |
| 56 | second screw holder |
| 58 | second screw |
| 60 | electrical junction box |
| 62 | top surface of electrical junction box |
| 64 | removable wall section |
| 66 | hole |
| 68 | fastener |
| 70 | head of second screw |
| 72 | head of first screw |
| 74 | protruding area |
| 76 | threaded bore in protruding area |
| 78 | grounding screw |
| 79 | hole in first leg |
| 80 | threaded portion of grounding screw |
| 84 | arcuate portion of side wall |
| 86 | straight portion of side wall |
| 88 | quick connect fitting |
| 89 | opening |
| 90 | overhead support |
| 92 | ceiling fan |
| 94 | mounting ring |
| 96 | mounting apertures |

DETAILED DESCRIPTION OF THE INVENTION

The present invention comprises a fan rated junction box assembly for simplifying the task and shortening the time involved in mounting a ceiling-mounted electrical device, such as a light fixture or a ceiling fan, to a ceiling.

Figure 1:
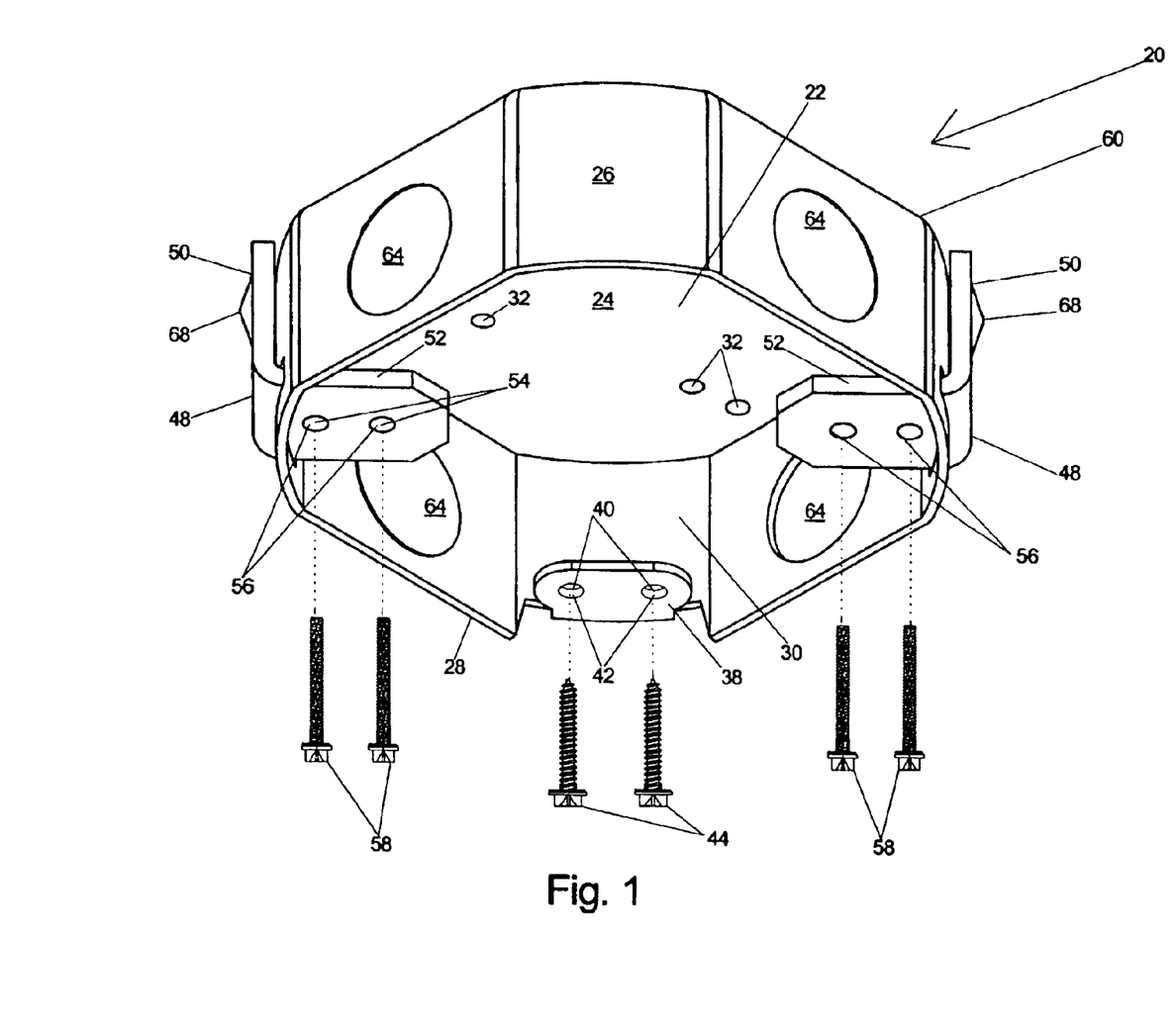
FIG. 1 is a perspective view of a preferred embodiment of a fan rated junction box assembly according to the present invention and with the required fasteners exploded away from their temporary holders.

With reference to FIG. 1 there is shown a fan rated junction box assembly 20 including a top wall 22 having a bottom surface 24 and a side wall 26 extending from the bottom surface 24 to a planar bottom rim 28 and defining an open cavity 30 therein. The top wall 22 includes apertures 32 therein. The side wall 26 includes an outer surface 34. A portion of the side wall 26 is bent at a right angle into the open cavity 30 thereby forming a ledge 38 above the bottom rim 28. A bore 40 is provided in the ledge 38, the bore in the ledge defining a first screw holder 42.

Figure 4:
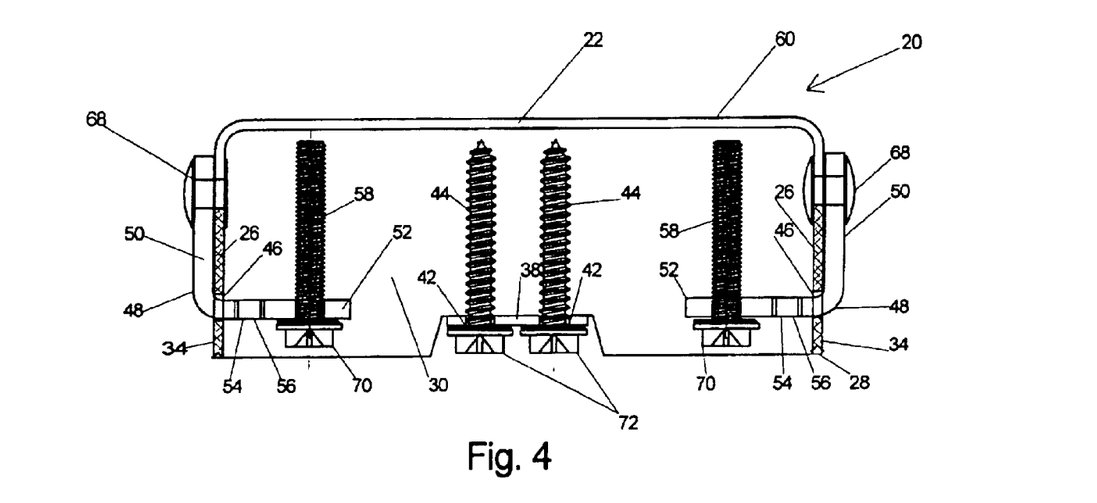
FIG. 4 is a sectional view of the fan rated junction box assembly taken along line 4—4 of FIG. 2.

With reference to FIG. 4, a first screw 44 is threadedly engaged in the first screw holder 42. Opposing slots 46 are provided in the side wall 26 and are located in such a manner that a line centered through the slots 46 divides the bottom rim 28 into symmetrical halves. Two right angle support members 48 each having a first 50 and a second 52 leg extend through the slots 46. The first leg 50 of the right angle support members 48 are secured to the outer surface 34 of the side wall 26 and the second legs 52 extend through the slots 46 and include at least one threaded bore 54 therein. The threaded bore 54 in the second leg 52 comprises a second screw holder 56. A second screw 58 is threadedly engaged in at least one of the second screw holders 56 in each right angle support member 48. The top wall 22, side wall 26, right angle support members 48 secured to the side wall 26, and ledge 38 thereby defines an electrical junction box 60.

Figure 3:
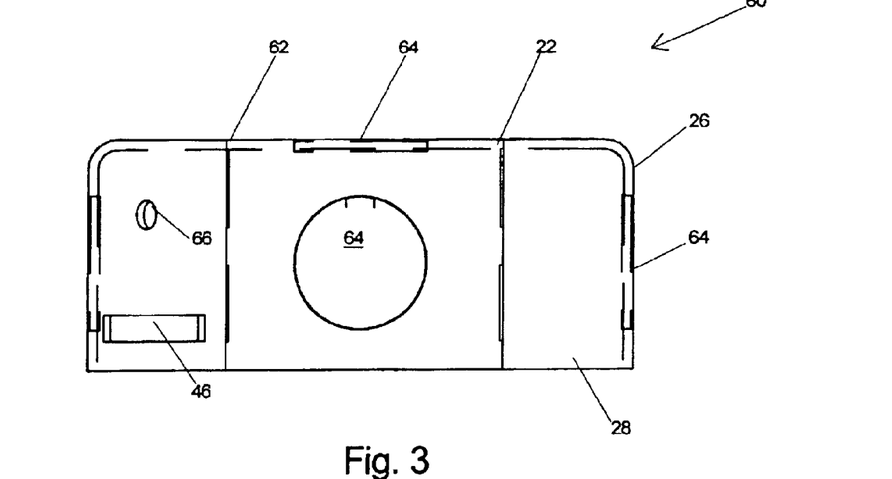
FIG. 3 is a side view of an electrical junction box which forms a portion of the fan rated junction box assembly of FIG. 1.

Referring to FIG. 3, the top wall 22 of the electrical junction box 60 includes a planar top surface 62. The side wall 26 includes one or more removable wall sections 64 that can be removed there from to form openings for pulling wire into the box or connecting conduit thereto. One of the opposing slots 46 is in view in FIG. 3 and is located in the side wall 26.

With reference to FIGS. 3 and 4, a hole 66 located above the slot 46 is available to accept a fastener 68 for securing the first leg 50 of the right angle support member 48 to the outer surface 34 of the side wall 26. Alternatively, the electrical junction box 60 and the right angle support members 48, which are preferably constructed of steel, could be secured by welding rather than by a fastener. As depicted in FIG. 4, the fan rated junction box assembly 20 is supplied with the first screws 44 inserted fully into the first screw holders 42 in the integral ledge 38 and with the second screws 58 inserted fully into the second screw holders 56 in the second legs 52 of the right angle support members 48. The opposing slots 46 are located a critical distance above the bottom rim 28 to position the heads 70 of the second screws 58 substantially above the bottom rim 28 when the second screws 58 are fully threaded into the second screw holder 56. The heads 70 of the second screws 58 are therefore completely contained within the open cavity 30 of the electrical junction box 60 when the second screws 58 are fully threaded into the second screw holder 56. The ledge 38 is also located a critical distance above the bottom rim 28 to position the heads 72 of the first screws 44 substantially above the bottom rim 28 when the first screws 44 are fully threaded into the first screw holder 42. The head 70 of each second screw 58 is typically 0.180 inch long as measured with respect to the axis of the second screw 58. The head 72 of each first screw 44 is typically 0.180 inch long as measured with respect to the axis of the first screw 44. The opposing slots 46 are therefore located preferably at a distance no less than 0.192 inch above the bottom rim 28. The ledge 38 is also located preferably at a distance no less than 0.192 inch above the bottom rim 28.

Figure 5:
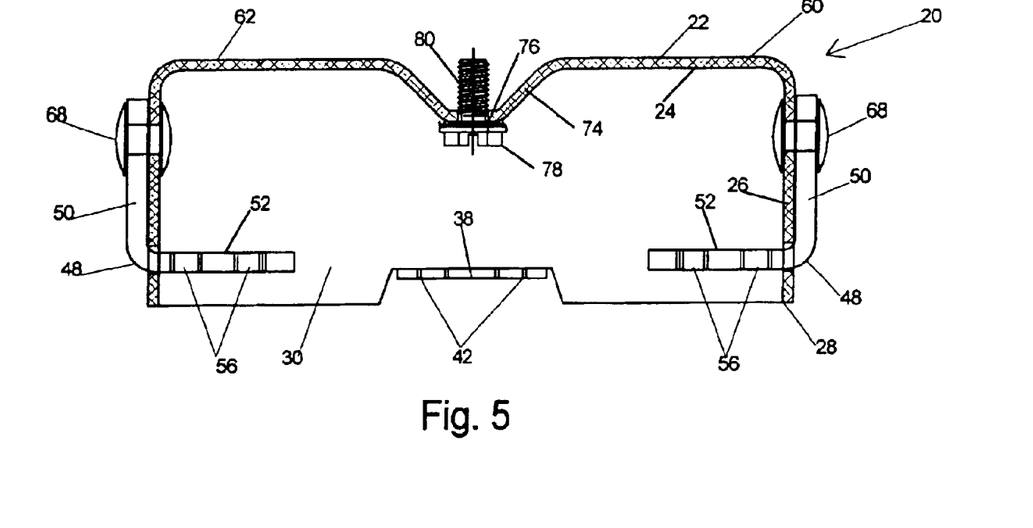
FIG. 5 is a sectional view of the fan rated junction box assembly taken along line 5—5 of FIG. 2.

With reference to the sectional view of the fan rated junction box assembly 20 in FIG. 5, the top wall 22 includes a protruding area 74 extending downwards from the bottom surface 24 of the top wall 22 into the open cavity 30. The protruding area 74 includes a threaded bore 76 and a grounding screw 78 threaded securely therein. The top wall 22 protrudes into the cavity 30 a distance preferably as long as or longer than the length of the threaded portion 80 of the grounding screw 78. To accommodate a 0.5 inch grounding screw 78, the protruding area 74 extends preferably at least 0.35 inch into the cavity 30 to accommodate the grounding screw 78 consisting of a threaded portion 80 that is typically 0.35 inch long. The grounding screw 78 therefore does not extend beyond the top surface of the top wall when the grounding screw is threaded completely within the threaded bore in the protruding area.

Figure 6A:
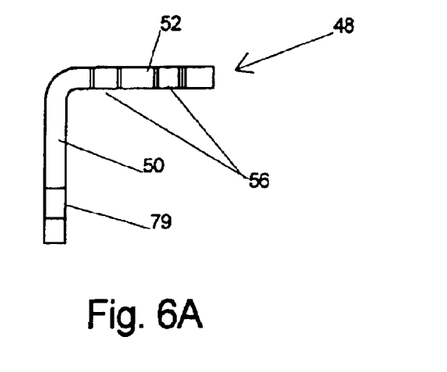
FIG. 6A is a side view of a right angle support member which forms part of the fan rated junction box assembly of FIG. 1.
Figure 6B:
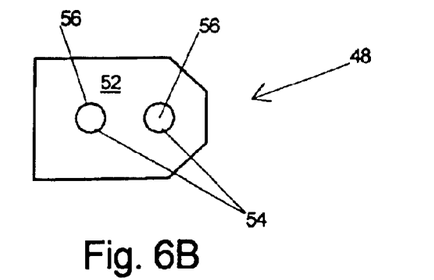
FIG. 6B is a top view of the right angle support member of FIG. 6A.
Figure 6C:
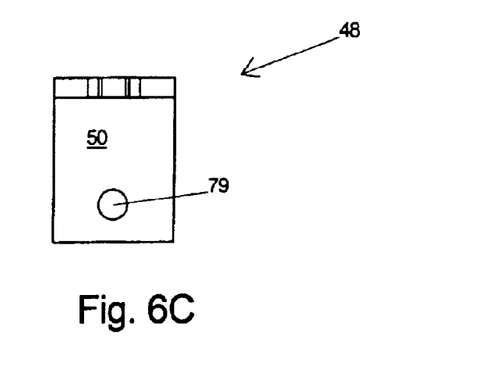
FIG. 6C is a side view of the right angle support member of FIG. 6A.

FIGS. 6A through 6C depict various views of the right angle support member 48 that forms a portion of the fan rated junction box assembly 20 of the present invention. The right angle support member 48 includes a first leg 50 and a second leg 52. The preferred embodiment of the first leg 50 includes the hole 79 for later inserting a fastener 68 such as the fastener 68 shown in FIG. 5. The second leg 52 includes one or more threaded bores 54, which will function as the second screw holders 56 of the junction box assembly.

With reference to FIGS. 5 and 6A, it should be noted that the top wall 22 and the side wall 26 of the fan rated junction box assembly 20 are preferably formed integrally of steel and are typically formed from a single sheet of steel having a first thickness. The right angle support members 48 are typically formed from steel plate of a second thickness which is preferably larger than the first thickness of the junction box 60. The second thickness of the right angle support member 48 is therefore greater than the first thickness of the electrical junction box 60 including both the top wall 22 and the side wall 26. The top wall 22 and side wall 26 of the junction box 60 is preferably between 0.50 and 0.70 inch thick. The right angle support member 48 is preferably between 0.115 and 0.135 inch thick. The thickness of the right angle support member 48, which will directly support most of the dynamic load exerted by a rotating ceiling fan, is therefore about twice the thickness of the walls 22, 26 of the junction box 60. Since the top wall 22 and side wall 26 of the electrical junction box 60 have a lesser thickness than the right angle support members 48, the electrical junction box 60 can be fabricated at a lower cost than would be the case if the junction box had to support the ceiling fixture directly.

Figure 2:
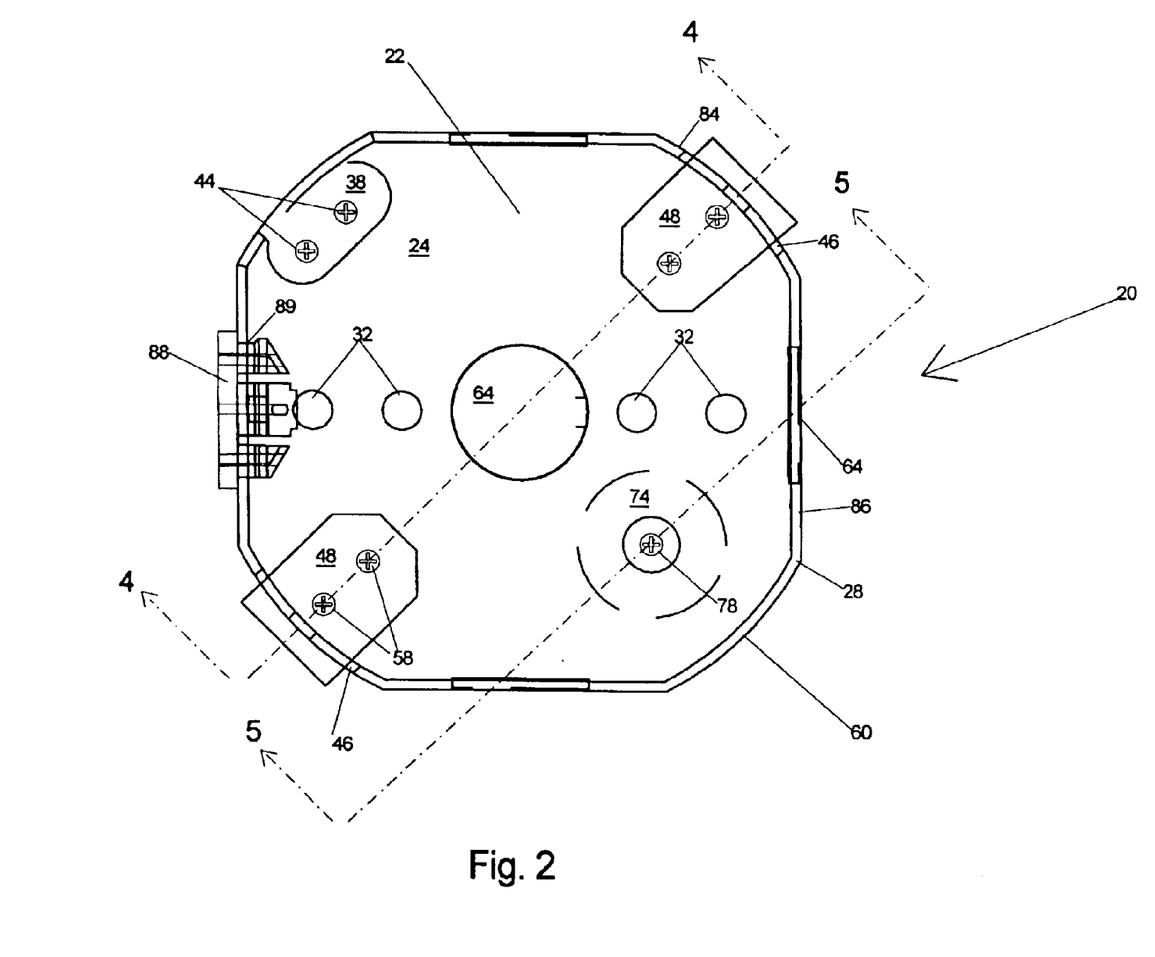
FIG. 2 is bottom view of the fan rated junction box assembly of FIG. 1.

As shown in FIG. 2, the opposing slots 46 in the side wall 26 are located in such a manner that a line centered through the slots divides the bottom rim 28 into symmetrical halves. Whether the slots 46 are secured to the arcuate portion 84 of the side wall 26 of the electrical junction box 60 or to the straight portion 86, they are placed on opposing sides to ensure that the weight of any electrical device later mounted to the junction box 60 will be balanced between the two right angle support members 48. The first screws 44 secured in the first screw holders 42 can later be moved to any of the apertures 32 in the top wall 22 to mount the electrical junction box 60 to an overhead support. As depicted on the left side of FIG. 2, a quick connect fitting 88, such as that shown and described in U.S. Pat. No. 6,143,982 which is incorporated herein by reference in its entirety, can be snapped into one or more of the openings 89 created by punching out removable wall sections or knockouts 64.

Figure 7:
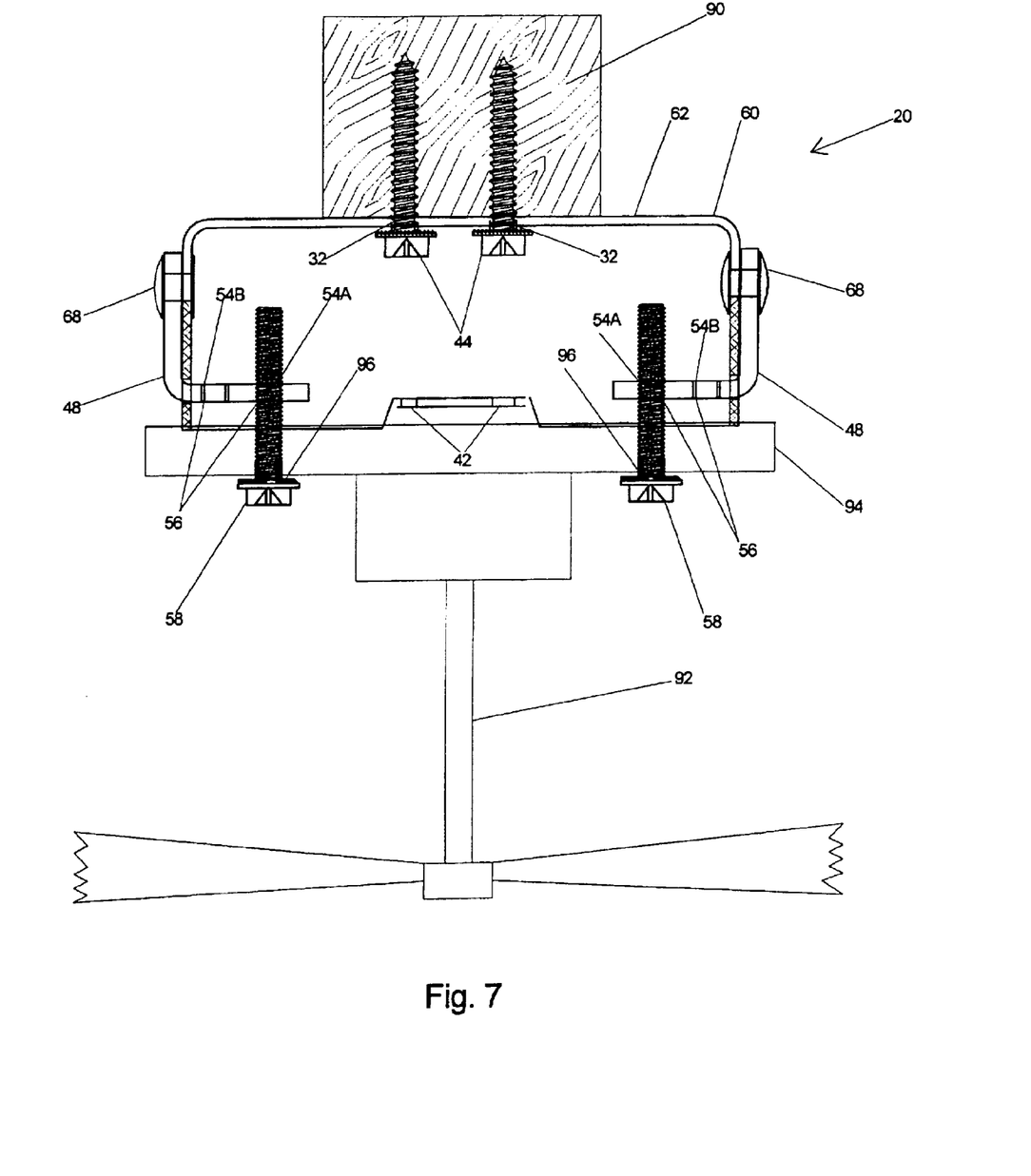
FIG. 7 is a sectional side view of the fan rated junction box assembly secured to an overhead support and with a ceiling fan secured to the junction box assembly.

FIG. 7 depicts a sectional view of the fan rated junction box assembly 20 of the present invention secured to an overhead support 90 and with a ceiling fan 92 secured to the junction box assembly 20. The ceiling fan 92 typically is provided with a top mounting ring 94 having mounting apertures 96 that are typically spaced a standard distance apart. The most common standard distances are 2.75 inches and 3.0 inches. The threaded bores 54 in the second legs 52 of the right angle support members 48 therefore are spaced apart a distance equivalent to the distance between the mounting apertures 96 in the mounting ring 94 of a ceiling-mounted electrical device. Therefore the preferred embodiment of the fan rated junction box assembly 20 preferably includes two threaded bores 54A, 54B in each right angled support member 48 to accommodate mounting rings 94 of either 2.75 or 3.0 inch mounting aperture spacing.

Referring to FIGS. 2 and 7, the preferred embodiment of the fan rated junction box assembly 20 is operated by first locating a suitable overhead support 90 such as a rafter. The top surface 62 of the electrical junction box 60 is placed against the overhead support 90. It should be noted that, at this point in the installation, with reference to FIG. 4, that the first screws 44 are temporarily secured within the first screw holders 42 and are contained entirely within the open cavity 30. Likewise, at this point in the installation, the second screws 58 are temporarily secured within the second screw holders 56 and are also contained entirely within the open cavity 30. It should be noted, with reference to FIG. 5, that the grounding screw 78, when fully inserted in the threaded bore 76, does not extend beyond the planar top surface 62 of the electrical junction box 60. Therefore, the top surface 62 of the junction box 60 can be placed flush against the overhead support 90 as shown in FIG. 7. Pilot holes are then drilled into the overhead support 90 at locations corresponding to two appropriate apertures 32 in the top wall 22. The first screws 44 can then be removed from the first screw holders 42 in the ledge 38 and repositioned to the selected apertures 32 in the top wall 22. The first screws 44 are then driven through the apertures 32 in the top wall 22 and completely into the overhead support 90 to secure the junction box 60 to the overhead support 90. At this point in the installation the fan rated junction box assembly 20 is secured to the overhead support 90, thus freeing the installer's hands. With the assembly firmly attached to the overhead support 90, the second screws 58 are the removed from the second screw holders 56. A ceiling-mounted electrical device, such as the fan 92 shown in FIG. 7, is then aligned with the junction box 60. Mounting apertures 96 in the mounting ring 94 are aligned with either the inner 54A or outer 54B threaded bores in the second legs 52 of the right angle support members 48, depending on the spacing of the mounting apertures 96 in the mounting ring 94. The second screws 58 are then placed through the mounting apertures 96 in the mounting ring 94 and tightened partially into the second screw holders 56 to temporarily hold the ceiling fan 92 to the junction box 60. Wiring connections (not shown) can then be completed between the house supply wiring and the wiring leads to the ceiling fan 92. After wiring connections are completed, the second screws 58 are tightened completely into the second screw holders 56 to secure the ceiling fan to the electrical junction box 60.

The mounting screws used in the fan rated junction box assembly 20 of the present invention need to be long enough and of a sufficient diameter to bear the static and dynamic loads exerted by a typical ceiling fan. The first screws 44 are therefore at least #10 sheet metal screws no less than 1.25 inches in length and the second screws 58 are at least #10 screws no less than 1.25 inches in length. As depicted in FIG. 7, the first screws 44 must be long enough to penetrate the overhead support to a sufficient extent to bear the load of the electrical box 60 and the suspended electrical device 92. The second screws 44 must be long enough to pass through the mounting ring 94 and into the threaded bore 54A in the right angle support member 48 to bear the static and dynamic loads of the suspended electrical device 92.

Referring to the sectional views of the fan rated junction box assembly 20 in FIGS. 4 and 5, a major objective of the junction box assembly 20 is the inclusion of all fasteners for mounting of the junction box 60, including the first screws 44 and second screws 58 held securely in temporary storage locations 42, 56. As a result of providing storage locations for the fasteners, the installer is freed of the task of finding the proper fasteners for the job. The installer's hands are also thereby freed of holding the required fasteners during the installation, thereby minimizing the possibility of losing the fasteners. As shown in FIGS. 4 and 5, all fasteners 44, 58, 78 are held within the confines of the junction box assembly 20, with the first 44 and second 58 screws in the cavity 30 and not extending beyond the bottom rim 28 and the grounding screw 78 not extending beyond the top surface 62 of the junction box assembly 20. This provides a significant advantage in the packaging, shipping, storage, and displaying of the junction box assembly 20. By having all the fasteners 44, 58, 78 confined within the confines of the junction box 60, each junction box assembly 20 can be easily packaged individually in a rectangular box. Additionally, several junction box assemblies 20 can be packaged in a large box that can be later opened by retailers and placed on a shelf at the retail establishment for display and availability to be removed individually by customers for purchase. Maintaining the fasteners 44, 58, 78 within the confines of the junction box assembly therefore provides many significant advantages to the packager, the shipper, the retailer, and the installer.

Having thus described the invention with reference to a preferred embodiment, it is to be understood that the invention is not so limited by the description herein but is defined as follows by the appended claims.

What is claimed is:

1. A fan rated junction box assembly comprising:
   a top wall having a top surface, a bottom surface, and apertures therein;
   a plurality of side walls extending from said bottom surface of said top wall and defining an open cavity therein, said side walls terminating in a planar bottom rim, each of said side walls including an outer surface;
   a portion of at least one of said side walls bent at a right angle into said cavity and forming a ledge above said bottom rim;
   a threaded bore in said ledge, said bore in said ledge defining a first screw holder;
   a first screw threadedly engaged in said first screw holder;
   opposing slots in two of said side walls located in such a manner that a line centered through said slots divides said bottom rim into symmetrical halves;
   two right angle support members having a first and a second leg;
   said first leg secured to said outer surface of two of said side walls;
   said second leg extending through said slots and having at least one threaded bore
   therein, said threaded bore in said second leg defining a second screw holder; and a second screw threadedly engaged in said second screw holder.

2. The fan rated junction box assembly of claim 1 wherein said second screw includes a head; and
   said head of said second screw is completely contained within said open cavity when said second screw is fully threaded in said second screw holder.

3. The fan rated junction box assembly of claim 1 wherein said first screw includes a head; and
   said head of said first screw is substantially above said bottom rim when said first screw is fully threaded in said first screw holder.

4. The fan rated junction box assembly of claim 1 wherein said top wall includes a protruding area extending into said open cavity.

5. The fan rated junction box assembly of claim 4 wherein said protruding area includes a threaded bore therein.

6. The fan rated junction box assembly of claim 5 wherein said threaded bore in said protruding area includes a grounding screw therein.

7. The fan rated junction box assembly of claim 5 wherein said grounding screw does not extend beyond said top surface of said top wall when said grounding screw is threaded completely within said threaded bore in said protruding area.

8. The fan rated junction box assembly of claim 1 wherein said side wall includes a first thickness;
   said right angle support members include a second thickness; and
   said second thickness of said right angle support member is greater than said first thickness of said side wall.

9. The fan rated junction box assembly of claim 1 wherein said top wall and said side wall are formed integrally of steel.

10. The fan rated junction box assembly of claim 1 including one or more removable wall sections in said top wall and said side walls.

11. The fan rated junction box assembly of claim 10 wherein one or more of said removable wall sections can be removed to create openings therein in said walls.

12. The fan rated junction box assembly of claim 10 including a quick connect fitting in one or more of said openings.

13. The fan rated junction box assembly of claim 1 wherein said threaded bores in said second legs of said right angle support members are spaced apart a distance equivalent to the distance between apertures in the mounting ring of a ceiling-mounted electrical device.

14. The fan rated junction box assembly of claim 13 wherein said ceiling-mounted electrical device is secured to said fan-rated junction box by removing said second screws from said second screw holders, aligning said apertures in said mounting ring with said threaded bores in said second legs, placing said second screws through said apertures in said mounting ring, and threading said second screws into said second screw holders.

15. The fan rated junction box assembly of claim 1 wherein said first screw holder serves as a temporary repository for said first screw which can be removed there from and driven through one of said apertures in said top wall to secure said junction box to an overhead support.

16. A method of mounting a ceiling-mounted electrical device to an overhead structure including the steps of providing a fan-rated junction box having a top wall with apertures therein, a plurality of side walls each having an outer surface, an open cavity defined by said top wall and said side walls, a bottom rim, a ledge formed by a portion of at least one of said side walls bent at a right angle into said cavity, first threaded screw holders in said ledge, first screws threadedly engaged in said first screw holders, slots in two of said side walls, two right angle support members each having a first leg secured to said outer surface of two of said side walls and a second leg extending through said slots, second threaded screw holders in said second legs, a second screw threadedly engaged in said second screw holder; locating a suitable overhead support for said fan-rated junction box; placing said fan-rated junction box against said overhead support; drilling pilot holes into said overhead support at locations corresponding to said apertures in said top wall; removing said first screws from said first screw holders in said ledge; repositioning said first screws to said apertures in said top wall; driving said first screws through said apertures in said top wall and completely into said overhead support to secure said box to said overhead support; removing said second screws from said second screw holders; providing a ceiling-mounted electrical device having a mounting ring with apertures and wiring leads therein;

placing said mounting ring against said bottom rim such that said apertures in said mounting ring are in alignment with said threaded holders in said second legs; driving said second screws through said apertures in said mounting ring and partially into said second screw holders to temporarily hold said electrical device to said box; completing electrical wiring between supply wiring and said wiring leads to said electrical device; and driving said second screws completely into said second screw holders to secure said electrical device to said box.

17. A fan rated junction box assembly comprising: a top wall; a plurality of side walls extending from said top wall and terminating in a bottom rim defining a plane; a portion of at least one of said side walls bent at a right angle and forming a ledge above said bottom rim; a threaded bore in said ledge, said threaded bore in said ledge defining a first screw holder; a first screw temporarily engaged in said first screw holder; opposing slots in two of said side walls; two right angle support members having a first and a second leg; said first leg secured to one of said side walls; said second leg extending through said slots and having at least one threaded bore therein, said threaded bore in said second leg defining a second screw holder; a second screw temporarily engaged in said second screw holder; and said first and said second screws completely enclosed within said top wall, said side walls, and said plane of said bottom rim.

18. The fan rated junction box assembly of claim 17 wherein said side walls is of a first thickness;

said right angle support members are of a second thickness; and said second thickness is greater than said first thickness.

19. The fan rated junction box assembly of claim 18 including apertures in said top walls;

a junction box defined by said top wall, said side wall, said right angle support members, said first screws temporarily engaged in said first screw holders, and said second screws temporarily engaged in said second screw holders; and said junction box securable to an overhead support by removing said first screws from said first screw holders and driving said first screws through said apertures in said top wall and into said overhead support.

20. The fan rated junction box assembly of claim 19 wherein the mounting ring of an electrical device is secured to said junction box by unthreading said second screws from said second screw holders; and rethreading said second screws through said mounting ring and into said second screw holders to secure said electrical device to said junction box.

* * * * *